US008971565B2

(12) United States Patent
Anzola

(10) Patent No.: US 8,971,565 B2
(45) Date of Patent: Mar. 3, 2015

(54) HUMAN INTERFACE ELECTRONIC DEVICE

(75) Inventor: Carlos A. Anzola, Bogota (CO)

(73) Assignee: Hie-D Technologies, LLC, Cambridge, MA (US)

( * ) Notice: Subject to any disclaimer, the term of this patent is extended or adjusted under 35 U.S.C. 154(b) by 1138 days.

(21) Appl. No.: 12/473,890

(22) Filed: May 28, 2009

(65) Prior Publication Data

US 2009/0296991 A1 Dec. 3, 2009

Related U.S. Application Data

(60) Provisional application No. 61/057,138, filed on May 29, 2008.

(51) Int. Cl.
*G06K 9/00* (2006.01)
*G06F 3/01* (2006.01)
*G06F 3/03* (2006.01)

(52) U.S. Cl.
CPC ............... *G06F 3/017* (2013.01); *G06F 3/011* (2013.01); *G06F 3/012* (2013.01); *G06F 3/0304* (2013.01)
USPC ............................ 382/100; 345/156; 715/799

(58) Field of Classification Search
CPC ............... G06K 9/0021; G06T 1/0007; H04N 2013/0074; G06F 3/0304; G06F 3/012; G06F 3/017; G06F 3/011
USPC .......... 382/100, 103, 104, 107; 345/156–158, 345/204, 419, 633; 715/799, 863; 713/400; 348/154, 164, E05.09; 356/27; 705/14.58; 455/456.1, 457; 463/30–32, 463/36–37
See application file for complete search history.

(56) References Cited

U.S. PATENT DOCUMENTS 5,168,531 A * 12/1992 Sigel ............................ 382/291
5,594,469 A * 1/1997 Freeman et al. ............... 345/158

(Continued)

OTHER PUBLICATIONS

D. A. Fay, A. M. Waxman, M. Aguilar, D.B. Ireland, J.P. Racamato, W.D. Ross, W. W. Streilien, and M. I. Braun, "Fusion of Multi-Sensor Imagery for Night Vision: Color Visualization, Target Learning and Search", IEEE Conference on Publication Fusion 2000, 3rd international conference on Information Fusion, vol. 1, 2000, pp. TUD3/3-TUD310.*

(Continued)

*Primary Examiner* — Hadi Akhavannik
(74) *Attorney, Agent, or Firm* — Brake Hughes Bellermann LLP

(57) ABSTRACT

According to one general aspect, an apparatus configured to facilitate user gesture-based input may include an optical sensor, a plurality of infrared sensors, and processor. In various embodiments, the optical sensor may be configured to capture image data, within the visual spectrum. In some embodiments, the plurality of infrared sensors configured capture positional information regarding gestures made by a user. In one embodiment, the processor may be configured to receive the image data captured by the optical sensor and the positional information captured by the plurality of infrared sensors. In some embodiments, the processor may be configured to process the image data captured by the optical sensor. In various embodiments, the processor may be configured to determine, for each infrared sensor, a movement vector including coordinates that represents movement associated with the respective infrared sensor. In one embodiment, the apparatus may be configured to provide signals relating to the processed image data and the plurality of movement vectors to a host apparatus configured to be controlled, at least in part, by gestures made by the user.

22 Claims, 10 Drawing Sheets

(56) References Cited

U.S. PATENT DOCUMENTS

| | | | |
|---|---|---|---|
| 7,558,622 B2* | 7/2009 | Tran | 600/509 |
| 7,843,429 B2* | 11/2010 | Pryor | 345/158 |
| 7,877,707 B2* | 1/2011 | Westerman et al. | 715/863 |
| 8,427,426 B2* | 4/2013 | Corson et al. | 345/157 |
| 2006/0033713 A1* | 2/2006 | Pryor | 345/158 |
| 2006/0264258 A1* | 11/2006 | Zalewski et al. | 463/36 |
| 2008/0080789 A1* | 4/2008 | Marks et al. | 382/296 |
| 2011/0086708 A1* | 4/2011 | Zalewski et al. | 463/36 |
| 2012/0036016 A1* | 2/2012 | Hoffberg et al. | 705/14.58 |
| 2012/0040755 A1* | 2/2012 | Pryor | 463/32 |

OTHER PUBLICATIONS

Zhiwei Zhu, Qiang Ji, "Eye and Gaze Tracking for Interactive Graphic Display", Machine Vision and Application (2004)).*

D. A. Fay, A. M. Waxman, M. Aguilar, D.B. Ireland, J.P. Racamato, W.D. Ross, W. W. Streilien, and M. I. Braun, "Fusion of Multi-Sensor Imagery for Night Vision: Color Visualization, Target Learning and Search", IEEE Conference on Publication Fusion 2000, 3rd international conference on Information Fusion, vol. 1, 2000, pp. TUD3-3-TUD3-10.*

* cited by examiner

100

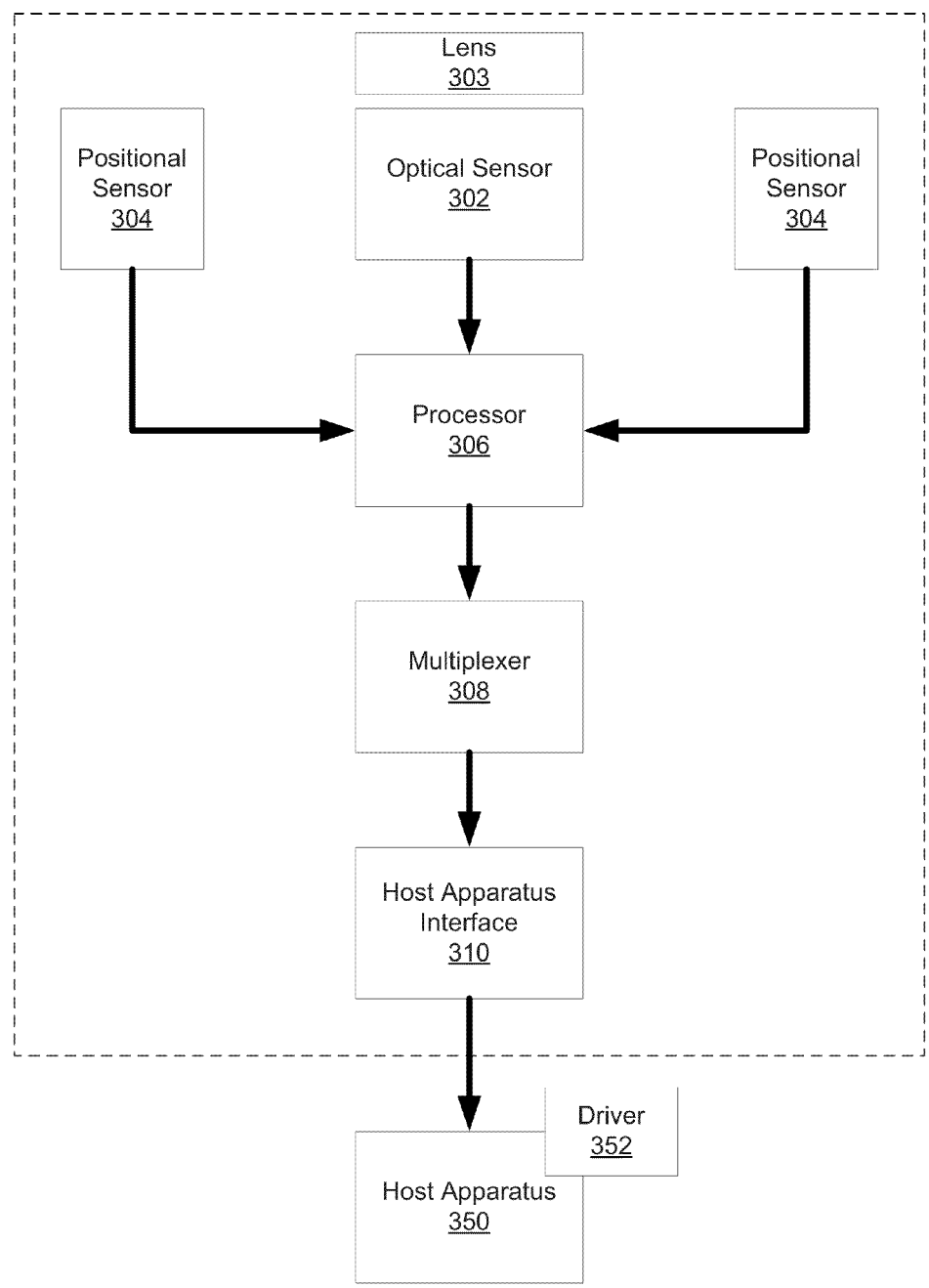

400

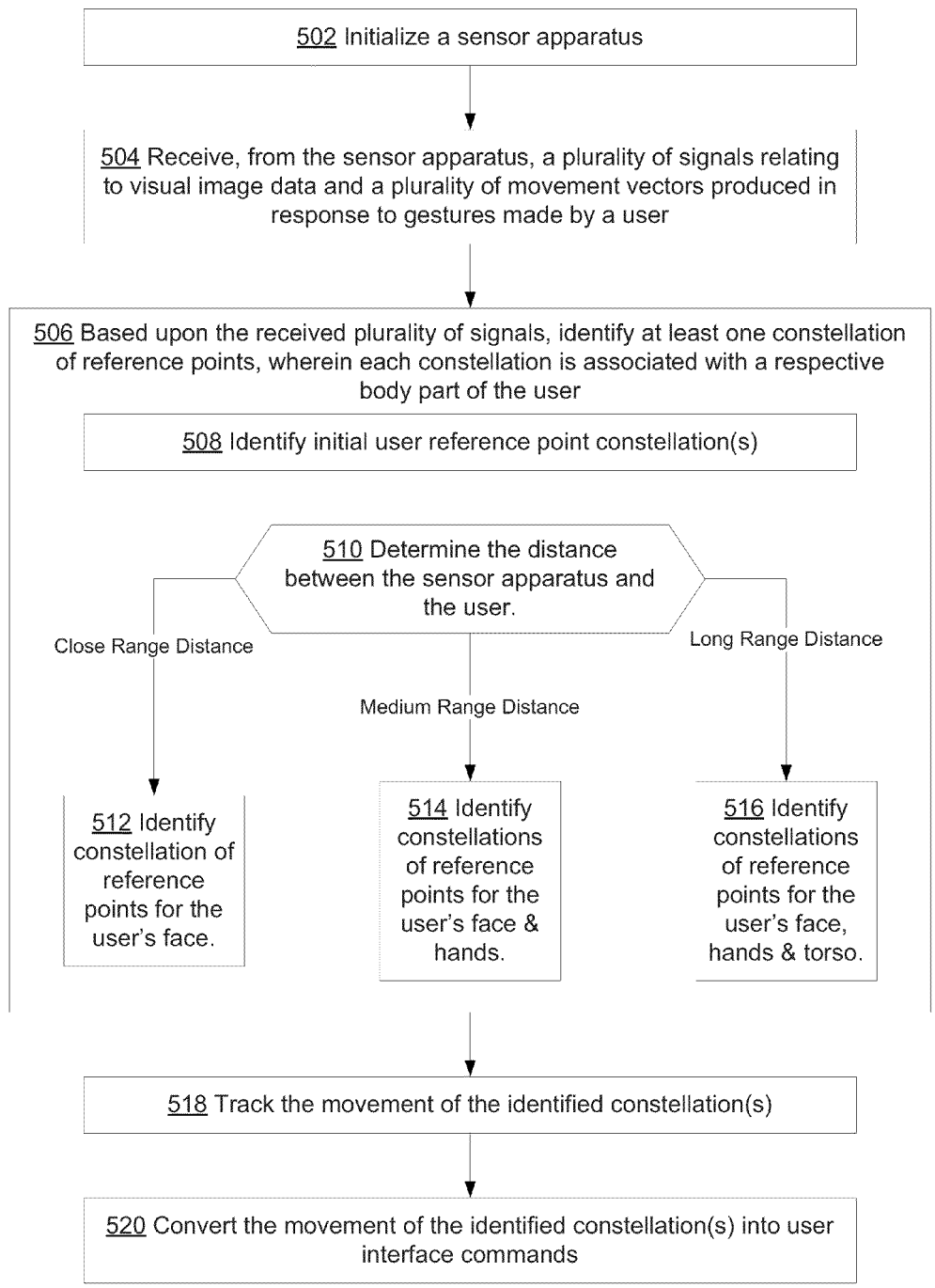

FIG. 6a
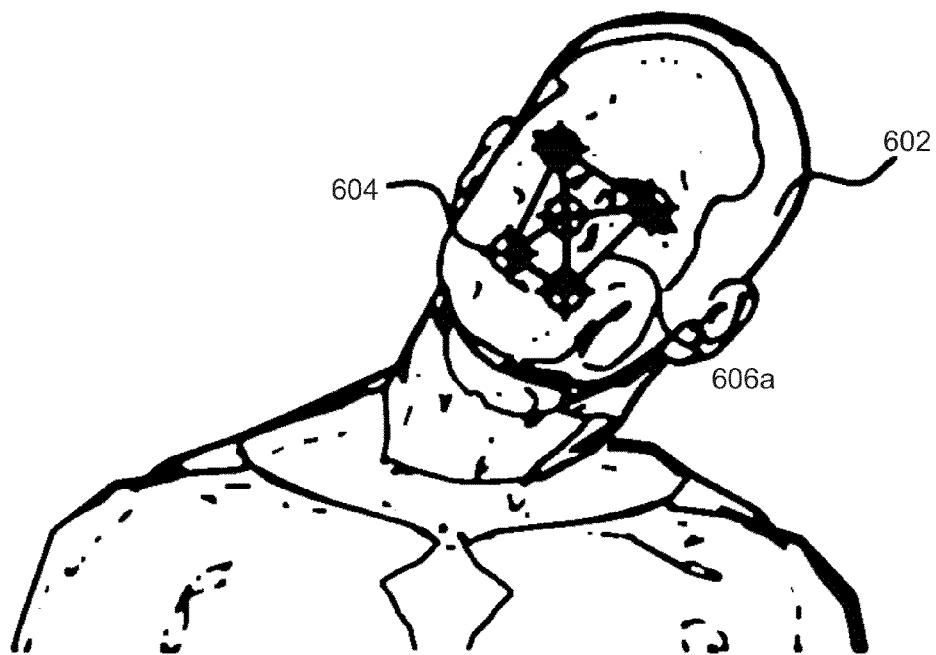
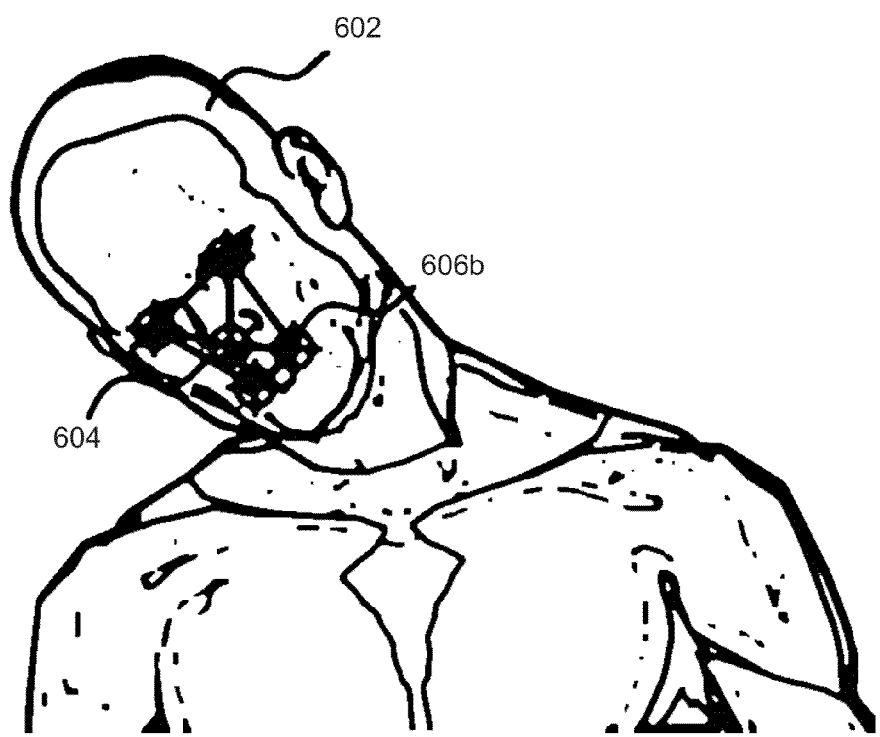

800

HUMAN INTERFACE ELECTRONIC DEVICE

CROSS-REFERENCE TO RELATED APPLICATION

This application claims priority under 35 U.S.C. §119 to U.S. Provisional Patent Application 61/057,138, filed May 29, 2008, titled "Human Interface Electronic Device (H.i.E-D)," which is incorporated herein by reference in its entirety.

TECHNICAL FIELD

This description relates to user interface controls, and more specifically to gesture-based user interface controls.

BACKGROUND

Typically, a user's interaction with a computer system, or an operating system based on windows or a graphical user interface has generally required a direct physical contact (e.g., via cables, some other physical mechanism, mechanical, electrical, etc.) interaction between the user and the system or interface device in order to control or perform any action or specific function or action. Available technology offers a wide range of input devices and interfaces that connect machines with the user, either through cables or wireless interfaces. However all of these marketed technologies generally require the user to touch or to come into contact with some sort of specific control device (e.g., keyboard, mouse, touch screen, remote control, etc.) to perform an action.

Essentially all of these user interfaces (e.g., remote control, keyboard, mouse, trackball, digitizer, control levers, buttons, switches, touch-sensitive screens, etc.) have usually had the same working principle; they require physical contact between the interface and the user. In some systems, e.g., popular remote controls, a portion of the systems are simply communication interfaces between the user held device and the controlled systems (e.g., computer, video game terminal, etc.). Often these control interfaces employ wireless technologies, such as, infrared (IR) or radio frequency (RF), to communicate between the user held device (e.g., mouse, remote control, Wii™-style wand, etc.). In this context a Wii™-style wand refers to a handheld controller for a Wii™ video game system sold by Nintendo™. Specifically, the Wii™ wand determines gross motor movements based upon internal accelerometers and received infrared signals (which are transmitted from a separate sensor bar). This collected data is then transmitted to the video game processor via a RF link.

SUMMARY

According to one general aspect, an apparatus configured to facilitate user gesture-based input may include an optical sensor, a plurality of infrared sensors, and processor. In various embodiments, the optical sensor may be configured to capture image data, within the visual spectrum. In some embodiments, the plurality of infrared sensors configured capture positional information regarding gestures made by a user. In one embodiment, the processor may be configured to receive the image data captured by the optical sensor and the positional information captured by the plurality of infrared sensors. In some embodiments, the processor may be configured to process the image data captured by the optical sensor. In various embodiments, the processor may be configured to determine, for each infrared sensor, a movement vector including coordinates that represents movement associated with the respective infrared sensor. In one embodiment, the apparatus may be configured to provide signals relating to the processed image data and the plurality of movement vectors to a host apparatus configured to be controlled, at least in part, by gestures made by the user.

According to another general aspect, a method to facilitate user gesture-based input may include capturing, via an optical sensor, image data, within the visual spectrum. In various embodiments, the method may also include capturing, via a plurality of positional sensors, positional information regarding gestures made by the user. In some embodiments, the method may include processing the image data captured by the optical sensor. In one embodiment, the method may further include determining, for each positional sensor, a movement vector including coordinates that represents movement associated with the respective positional sensor. In various embodiments, the method may also include providing signals relating to the processed image data and the plurality of movement vectors to a host apparatus configured to be controlled, at least in part, by gestures made by the user.

According to another general aspect, a computer program product for facilitating user gesture-based input may be tangibly embodied on a computer-readable medium and include executable code that, when executed, is configured to cause a host apparatus to receive, from a sensor apparatus, a plurality of signals relating to visual image data and a plurality of movement vectors produced in response to gestures made by a user. In various embodiments, the computer program product may also include code to cause the host apparatus to, based upon the received plurality of signals, identify at least one constellation of reference points, wherein each constellation is associated with a respective body part of the user. In some embodiments, the computer program product may also include code to cause the host apparatus to track the movement of the body part(s) of the user, based at least in part upon the respective identified constellation(s). In one embodiment, the computer program product may also include code to cause the host apparatus to convert the movement of the respective body part(s) of the user into user interface commands.

The details of one or more implementations are set forth in the accompanying drawings and the description below. Other features will be apparent from the description and drawings, and from the claims.

A system and/or method for facilitate user gesture-based input, substantially as shown in and/or described in connection with at least one of the figures, as set forth more completely in the claims.

BRIEF DESCRIPTION OF THE DRAWINGS

FIG. 3 is a block diagram of an example embodiment of an apparatus in accordance with the disclosed subject matter.

FIG. 5 is a flow chart of an example embodiment of a technique in accordance with the disclosed subject matter.

Like reference symbols in the various drawings indicate like elements.

DETAILED DESCRIPTION

Figure 1:
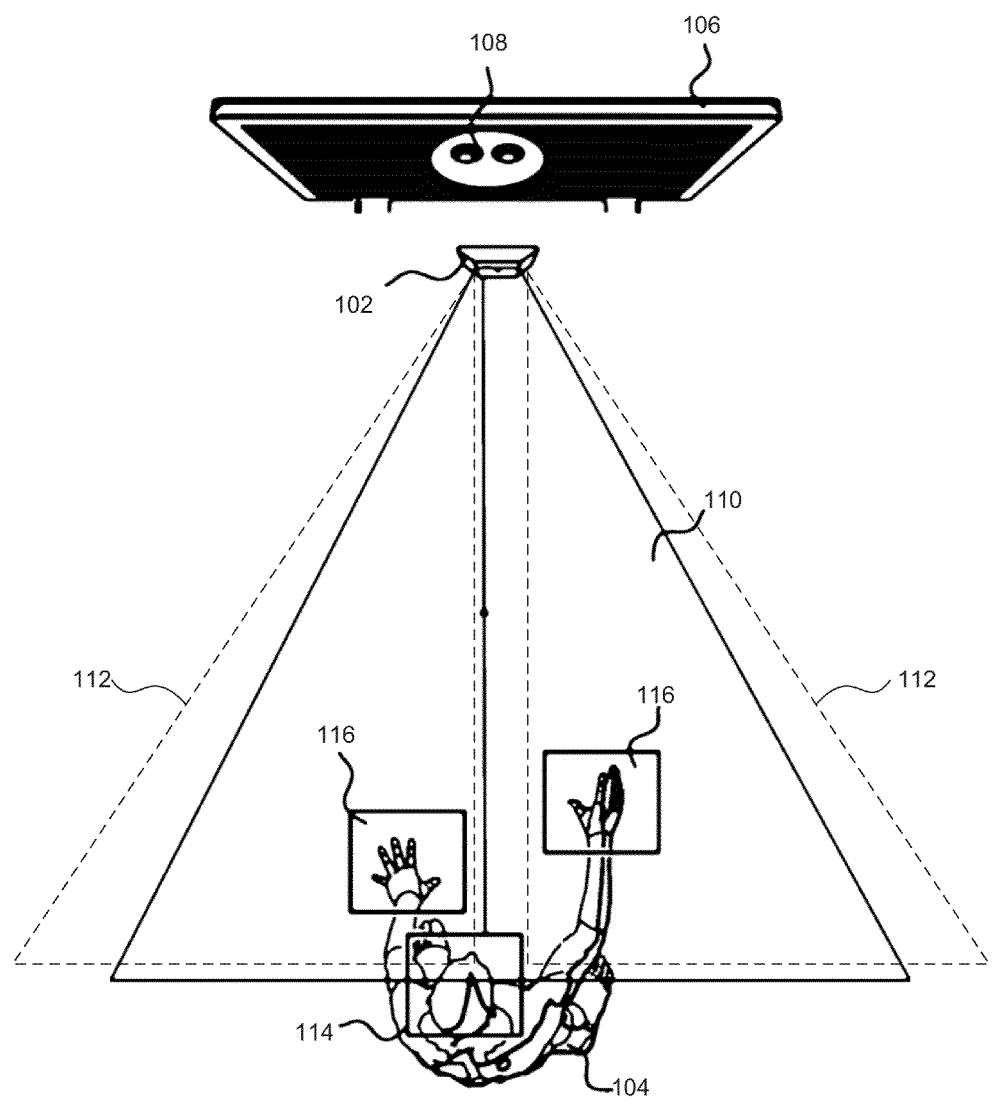
FIG. 1 is a block diagram of an example embodiment of a system in accordance with the disclosed subject matter.

FIG. 1 is a block diagram of an example embodiment of a system 100 in accordance with the disclosed subject matter. In various embodiments, the system 100 may include a sensor apparatus or device 102 and a host apparatus or device 106. In some embodiments, the system 100 may be configured to interact or receive input from a user or human 104.

In various embodiments, the host device 106 may include a computer (e.g., desktop PC, etc.) or any other device or mechanism configured to be controlled by a user 104 (e.g., a robot, a crane, automobile, an industrial machine, etc.). It is understood that while a computer screen or all-in-one computer is illustrated this is merely an illustrative example to which the disclosed subject matter is not limited. In various embodiments, the host device 106 may include an application 108 (e.g., operating system, embedded application, video game, etc.). In various embodiments, the host device 106 may be configured to control multiple devices or applications.

In some embodiments, the application 108 may be configured to be controlled, at least in part, by a user 104. In some embodiments, the application 108 may be configured to be controlled by a graphical user interface. In a specific embodiment, this application 108 (or set of applications on the hosted device 106) may be configured to be controlled by user 104 via a more typically mouse or keyboard user interface. In such an embodiment, the sensor device 102, the host device 106, a combination thereof, a portion or software application (e.g., a driver) executed thereby may be configured to translate user 104 gestures into corresponding more typical mouse or keyboard user interface actions (e.g., movements, clicks, etc.).

In various embodiments, the sensor apparatus or device 102 may be configured to track or capture movement or images of a user 104, and relay or transmit a portion or a representation thereof to the host device 106. In various embodiments, the sensor device 102 may include an optical or visual light sensor and a plurality of positional or infrared sensors (described in more detail in relation to FIGS. 2 & 3).

In such an embodiment, the sensor device 102 may be configured to generate a first field of view 110. In various embodiments, this first field of view 110 may be generated or created via the optical sensor. In one embodiment, the angle of the first field of view 110 may be approximately or substantially 75° horizontal, approximately or substantially 55° vertical; although, it is understood that the above is merely one illustrative example to which the disclosed subject matter is not limited. In various embodiments, optical sensor and therefore, the first field of view 110 may be located in the central or front part of the sensor device 102 and in between the plurality of positional or infrared sensors. In such an embodiment, position of the first field of view 110 may be selected in order to locate the user 104 in the center of the space in front of the sensor device 102 for initial tracking or image capturing.

In various embodiments, the sensor device 102 may be configured to generate of a plurality of secondary fields of view 112. In various embodiments, these secondary fields of view 112 may be generated or created via the plurality of positional or infrared sensors. In the illustrated embodiment, the positional or infrared sensors may be placed such that the secondary fields of view 112 are limited to certain portions of the user 104 (e.g., the left side of the user 104, the right side of the user 104, etc.). In one embodiment, the positional or infrared sensors may be positioned symmetrically to the left and right of the optical sensor, with an inclination towards the back of the sensor device 102 of an angle of substantially or approximately 15°; although, it is understood that the above is merely one illustrative example to which the disclosed subject matter is not limited.

In some embodiments, the sensor device 102 may be configured to track or capture the movement of one or more body part of the user 104. In the illustrated embodiment, the sensor apparatus 102 may be configured to track or capture the movement (or lack thereof) of the user's 104 head 114 and hands 116; although, it is understood that the above are merely a few illustrative examples to which the disclosed subject matter is not limited. In various embodiments, different portions of the user's 104 body may be tracked or captured primarily by one type of the sensors (e.g., optical or infrared sensors) or fields of view (e.g., fields of view 110 and 112).

In one embodiment, the sensor device 102 may be configured to track multiple gesture commands substantially simultaneously (e.g., a hand gesture and a head gesture, etc.). In another embodiment, the sensor device 102 may be configured to prioritize gestures from one body part over gestures from another body part (e.g., prioritizing hand gestures over head gestures, etc.).

Figure 2:
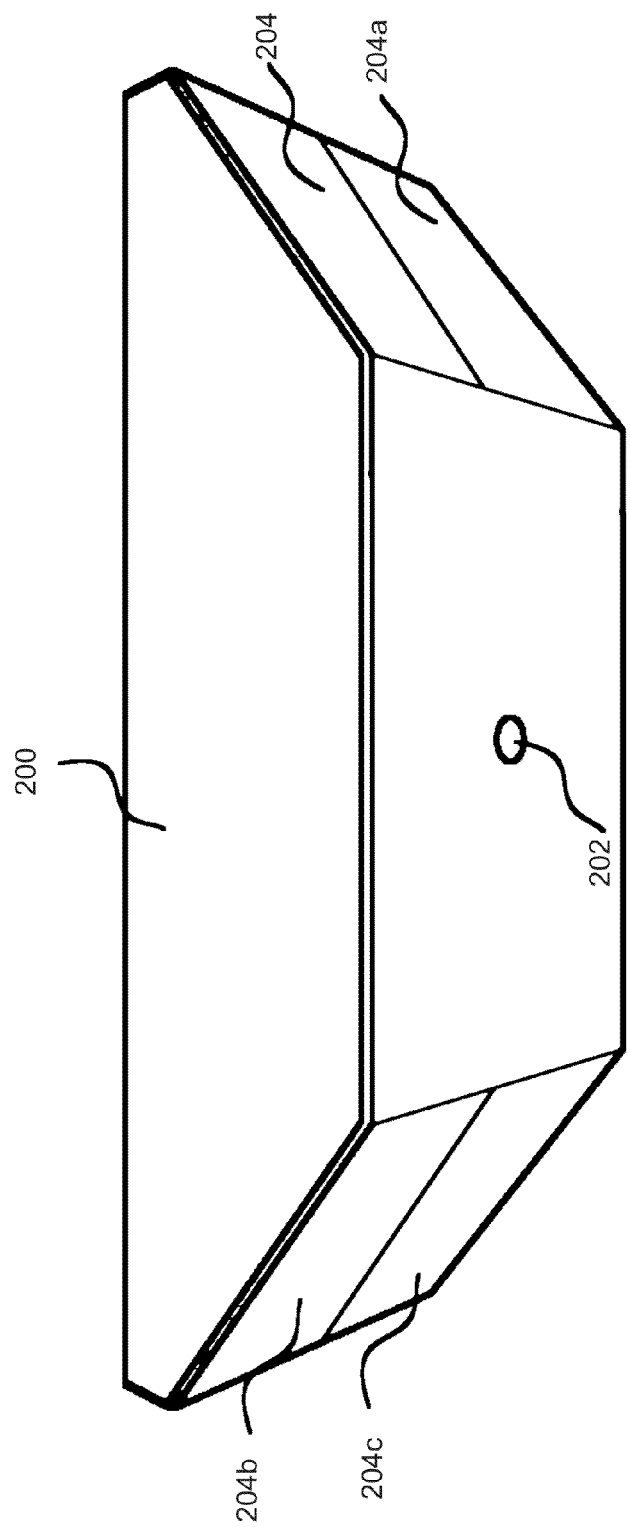
FIG. 2 is a diagram of an example embodiment of an apparatus in accordance with the disclosed subject matter.

FIG. 2 is a diagram of an example embodiment of an apparatus 200 in accordance with the disclosed subject matter. In various embodiments, the sensor apparatus or device 200 may include an optical or visual light sensor 202 and a plurality of positional or infrared sensors (e.g., positional sensors 204, 204a, 204b, and 204b). It is understood that while four positional or infrared sensors 204 are illustrated the disclosed subject matter is not so limited.

As described above, in various embodiments, the optical sensor 202 may be configured to provide or capture images from a first field of view substantially centered in front of the sensor apparatus 200. However, in another embodiment, a plurality of optical sensors 202 may be employed, wherein each optical sensor 202 is configured to capture a different field or view and possibly a different user. For example, in a multi-user system, a plurality of optical sensors 202 may be positioned in order to provide a field of view centered upon each user. In yet another embodiment, the plurality of optical sensors may be positioned to provide overlapping or redundant fields of view to a single user. It is understood that the above are merely a few illustrative examples to which the disclosed subject matter is not limited.

As described above, in various embodiments, the plurality of positional or infrared sensors 204 may be configured to provide secondary fields of view. In some embodiments, the plurality of sensors 204 or sub-groups thereof may be positioned to provide substantially non-overlapping or distinguishable fields of view (e.g., left and right fields of view, etc.).

In one embodiment, the four illustrated positional or infrared sensors 204, 204a, 204b, and 204c may be positioned substantially symmetrically to the left and right of the optical sensor 202, with two of the positional or infrared sensors 204 on each horizontal extreme. In various embodiments, the inclination towards the back of the sensor device 200 may be at an angle of approximately or substantially 15°. As described above, such an angle may limit the fields of view of the sensors to the right and left, side of the user's body. These positional or infrared sensors 204 may be configured to constantly track the shape, distance, position and movements, and, in various embodiments, the gestures of the user. In some embodiments, the positional or infrared sensors 204 may act or operate substantially independently from the optical sensor 202. In such an embodiment, their readings may be different from the optical sensor 202. In various embodiments, each positional or infrared sensor 204 or sensor sub-group (e.g., sensors 204 & 204a, and sensors 204b & 204c, etc.) may read or capture triangulation data in a substantially independent fashion.

FIG. 3 is a block diagram of an example embodiment of an apparatus 300 in accordance with the disclosed subject matter. In various embodiments, a sensor apparatus or device 300 may include an optical sensor 302, a plurality of positional sensors 304, a processor 306 and a host apparatus interface 310. In various embodiments, the sensor device 300 may also include a multiplexer 308.

In some embodiments, the sensor device 300 may be or be configured to be in communication with a host device or apparatus 350. In some embodiments, the host device or apparatus 350 may include a software, hardware, firmware or a combination thereof (e.g., a driver 352) configured to receive signals from the sensor device 300 and utilize the received signals as user interface commands, as described above. In various embodiments, the host apparatus 350 may include (not illustrated) a processor, a memory, and/or a sensor apparatus interface port or wireless interface; although, it is understood that the above are merely a few illustrative examples to which the disclosed subject matter is not limited. As described above, the host apparatus 350 may include a computer or any other device or mechanism configured to be controlled by a user (e.g., a robot, a crane, an automobile, an industrial machine, etc.).

In some embodiments, the optical sensor 302 may be configured to capture or take images substantially within the human visual spectrum of light. Although, in some embodiments, the optical sensor 302 may be configured to capture or take images during low light situations via use or the ability to capture images via the infrared or near-infrared spectrum or via a "night-vision" optical configuration designed to increase the efficiency of light utilization or minimize light reflection by the optical sensor 302. In various embodiments, the optical sensor 302 may include a charge-coupled device (CCD) or sensor. In another embodiment, the optical sensor 302 may include another type of digital photography or digital optics technology and it is understood that the above is merely one illustrative example to which the disclosed subject matter is not limited.

In various embodiments, the optical sensor 302 may be configured to possess or include a dedicated optic focal lens 303, for example, made out of glass or plastic material. In various embodiments, such a lens 303 may be meniscus (i.e., convex on one side and concave on the other). In some embodiments, the lens 303 may include a fixed longitudinal focus. In some embodiments, the lens 303 may be configured to capture the maximum or a substantially maximum possible amount of light for each image taken by the optical sensor 302. In one embodiment, the distance from the optic center of the lens 303 to the surface of the optical sensor 302 may be relatively short (e.g., approximately 16 mm, etc.); although, it is understood that the above is merely one illustrative example to which the disclosed subject matter is not limited. In various embodiments, such a distance may not be adjustable. In one embodiment, there may be no ability to manually or automatically zoom or focus the optical sensor 302.

In various embodiments, the lens 303 may be calibrated to focus on a predetermined point, but may include a slight level of optic aberration caused by the lens' 303 aperture. In such an embodiment, the aberration may allow the technique embodied in the software, hardware, firmware of a combination thereof to distinguish between images that are substantially clear (e.g., originate close to the central focal point), and those that are originate in the lens' 303 "circle of confusion". In this context the term "circle of confusion" may include an optical spot caused by a cone of light rays from a lens (e.g., lens 303) not coming to a perfect focus when imaging a point source. In some embodiments, any or a substantial portion of images tracked by the optical sensor 302 that are within the lens' 303 circle of confusion may be marked or regarded as invalid by the technique embodied in the software, hardware, firmware of a combination thereof In one specific embodiment, the sensor apparatus or device 300 may include an optical sensor 302 that includes a charge-coupled device (CCD) chip manufactured of a metal oxide material and composed of minute photoelectric cells. In various embodiments, the CCD chip may include a CCD chip of approximately ¼ of an inch; although, it is understood that the above is merely one illustrative example to which the disclosed subject matter is not limited.

In various embodiments, each photoelectric cell may have a size ranging substantially from 25 to 150 microns. In one embodiment, these cells may be configured to read the emissions of electrons or photons reflected from an object (e.g., the user or portion thereof) when it is illuminated with electromagnetic radiation or light (artificial or natural). In such an embodiment, each photon may be read by the photoelectric cells and recorded or translated into a voltage level. In one embodiment, the level of the voltage or amount of electrons produced per given time unit may be proportional to the amount of photons captured by a photoelectric cell.

In various embodiments, the more photoelectric cells are included by the optical sensor 302, the higher the resolution of the tracked image and, in one embodiment, the higher the optical sensor's 302 response speed and response quality. In various embodiments, the optical sensor 302 may be configured such that color may not affect the capturing or tracking of images or objects (e.g., the user's head, etc.).

In various embodiments, the sensitivity of the optical sensor 302 may depend on the number of photons that must be measured by a photoelectric cell (or other measuring portion of the optical sensor 302) in order to generate a voltage or similar electrical response. In a preferred embodiment, the optical sensor 302 may be configured to capture or record photons with an ambient light with less than 0.5 lux, wherein lux is the metric unit of illuminance and luminous emittance. In various embodiments, the optical sensor 302 may be configured to capture or record photons in conditions with ambient light above a predetermined, for example, by hardware limitations or configurable value, above a minimum ambient light level (e.g., 0 lux, 0.1 lux, 0.25 lux, 0.5 lux, 0-0.5 lux, etc.); although, it is understood that the above are merely a few illustrative examples to which the disclosed subject matter is not limited.

In such an embodiment, the optical sensor 302 may be configured to provide an "optimal responsiveness" in poor lighting conditions. In various embodiments, the levels of photonic noise may be minimal given that the processing of the output signal of the optical sensor 302 may occur, in one embodiment, outside the optical sensor 302 and within the processor 306. In some embodiments, as lighting conditions approach 0 lux, photonic noise may become an issue. Typically the amount of photons that are qualified as noise may be, in one embodiment, the square root of the total number of photons, such that for a small number of received or captured photons, noise as a percentage of the total received or captured photons may become relatively large or undesirable.

As described above, in various embodiments, the visual angle of the optical sensor 302 included within one embodiment of the sensor apparatus or device 300 may be approximately or substantially 75° horizontal, and 55° vertical As described above, in one embodiment, the optical sensor 302 may be located in the central front part of the sensor apparatus or device 300 and in between the plurality of positional sensors 304. In various embodiments, such a position may facilitate the locating of the user in the center of the optical sensor's 302 field of view. Although, it is understood that the above are merely a few illustrative examples to which the disclosed subject matter is not limited.

In various embodiments, optical sensor 302 may be configured to transform the voltages or electrical signal produced as a result of capturing the above described image or images into an analog signal. In various embodiments, this analog signal may be transferred to the processor 306 via packets of information. As described below, these packets of information may be subsequently processed by the sensor device's 300 processor 306.

As described above, in various embodiments, the sensor device 300 may include a plurality of positional sensors 304. In some embodiments, these positional sensors may include infrared sensors; although, it is understood that the above is merely one illustrative example to which the disclosed subject matter is not limited. In various embodiments, each positional sensor 304 may include an emitter and receiver configured to, respectively, emit and receive light at a predetermined wavelength or set of wavelengths (e.g., infrared light).

As described above in reference to FIG. 2, in one specific embodiment, four positional sensors 304 may be positioned symmetrically to the left and right of the optical sensor 302, with two positional sensors 304 on each horizontal extreme per side. In various embodiments, the positional sensors 304 may be positioned with an inclination towards the back of the sensor device 300 at an angle of 15°. Although, it is understood that the above are merely a few illustrative examples to which the disclosed subject matter is not limited. In various embodiments, the backwards inclination may be selected to limit the fields of view of the positional sensors 304 to the right and left sides of a user's body.

In various embodiments, the positional sensors 304 may be configured to work in a wide range of types of lighting, for example from complete darkness to direct light from either artificial or natural light sources. In such an embodiment, the positional sensors 304 may not require a secondary light source, even in ultraviolet light or light below a wavelength of substantially 400 nm (e.g., approximately the edge of visible violet light).

In various embodiments, the positional sensors 304 may be configured be focused upon or detect a substantially single frequency or relatively narrow range of frequencies of light. In some embodiments, the frequency that the positional sensors 304 may be configured to be responsive to may also be the frequency the positional sensors 304 are configured to emit. In such an embodiment, other infrared or other light sources in the room or space surrounding the user may not interfere with the measurements from the positional sensors 304.

In some embodiments, each positional sensor 304 may comprise, a Position Sensitive Device (PSD) comprising, in one embodiment, an alignment of photodiodes that respond to a predetermined frequency or range of predetermined frequencies of infrared light. In various embodiments, the each positional sensor 304 may comprise an oscillator configured to oscillate at the predetermined frequency. In some embodiments, each positional sensor 304 may comprise a light emitting diode (LED) configured to emit light at substantially the predetermined frequency and possibly, in some embodiments, additional frequencies. In various embodiments, each positional sensor 304 may be configured to produce an outgoing analog signal based at least in part upon the level of received light at the predetermined frequency or range of predetermined frequencies. In various embodiments, each positional sensor 304 may include a voltage regulator configured to assist in producing this outgoing analog signal. It is understood that the above are merely a few illustrative examples to which the disclosed subject matter is not limited.

In some embodiments, the infrared emission and reception components of each positional sensor 304 may be housed within a conductive resin (e.g., a carbonic-type Acrylonitrate, Butadiene and Styrene (ABS) resine, etc.), where they are protected from inductions and harmful static charges. In another embodiment, each positional sensor 304 may be configured to operate at a short wave length and have little or substantially no thermal inertia, such that the moment or relatively quickly after each positional sensor 304 is provided with electric energy each positional sensor 304 may already be at their optimal working conditions.

In some embodiments, the infrared light emitters encased along with each positional sensor 304 may only be enabled to emit infra red light, and may be configured to predefined characteristics with regard to longitudinal wavelengths and transmission reach. In one illustrative embodiment, each positional sensor 304 may be configured to send out or transmit light sequences periodically (e.g., every 10 ms); although, it is understood that the above is merely one illustrative example to which the disclosed subject matter is not limited.

In various embodiments, once the infrared light is emitted it may be amplified through an optic lens (e.g., an acrylic-resin optic lens) or any other amplifying material. In one illustrative embodiment, each positional sensor 304 may be configured to transmit infrared light that oscillates at a predetermined frequency (e.g., ~75.4 khz, etc.); although, it is understood that the above is merely one illustrative example to which the disclosed subject matter is not limited. In various embodiments, this predetermined frequency may be produced by the internal oscillation circuit embedded in each sensor, as described above.

In various embodiments, the receivers of infrared light may include electronic components composed of, for example, a pyro-electric material. In some embodiments, these receivers may be packaged within the same casing of the sensors in a PSD photodiode arrangement. In various embodiments, these receivers may be configured to measure the radiation produced by reflections of the infrared light from objects within the positional sensor's 304 field of view (e.g., a user's hand, a user's head, etc.). In one embodiment, the receivers may be configured to respond exclusively or substantially exclusively to the same predetermined frequency produced by the emitters and be capable of filtering unwanted or undesired infrared light that may otherwise produce false readings. In various embodiments, each positional sensor 304 may include a resin-acrylic lens located at the exits of each receiver and configured to filter the unwanted or undesired infrared light that may otherwise produce false readings.

Additionally in some embodiments, each positional sensor 304 or the receivers thereof may be configured to measure the location and return speed with which the infrared light is reflected from its point of reflection (e.g., a user's hand, a user's head, etc.). In some embodiments, the coefficients of reflection may be very high, such that a majority of materials (with the exception of objects, such as, for example, mirrors) may give off reflected infrared light including a materially important characteristic that may be picked up by the sensors.

It is understood that the above internal components and workings of the positional sensors 304 are merely a few illustrative examples to which the disclosed subject matter is not limited. In various embodiments, other internal arrangements and configurations may be employed. Further, in various embodiments, these positional sensors 304 may be configured to utilize or employ wavelengths of light outside or in addition to the infrared spectrum.

In various embodiments, these positional sensors 304 may be configured to constantly or periodically track various characteristics of a user or the gestures made by a user (e.g., the shape, distance, position and movements of the user or a portion thereof). In some embodiments, the positional sensors 304 may be configured to act independently from the optical sensor 302, and provide readings differently from the optical sensor 302. In various embodiments, each positional sensor 304 may be configured to provide triangulation data in an independent fashion.

In various embodiments, each positional sensor 304 or sub-group thereof (e.g., positional sensors 204 & 204a and positional sensors 204b & 204c of FIG. 2) may be configured to capture positional information regarding gestures made by the user and provide that data to the processor 306.

In one embodiment, the processor 306 or, in another embodiment, the positional sensors 304, may be configured to create or recreate a virtual matrix in the X, Y, and Z axes upon which the user's body or other object may be placed. In such an embodiment, when the user interferes with the matrix (e.g., with a hand gesture), it initiates a cycle in which the physical properties or characteristics of infrared reflection locate the position of the user's body part (e.g., hand, the fingers, etc.) within the three dimensional space. In such an embodiment, positional sensors 304 may be configured to measure in real-time or near real-time the distance and triangulated position where the reflection originates and transmit these to the processor 306 and eventually the host apparatus 350 to execute an action based pre-established commands.

In various embodiments, once a user interferes or interacts with the virtual matrix (e.g., moving their hand, etc.), the processor 306 or, in another embodiment, the positional sensors 304 may be configured to measure, through triangulation, the trajectory, speed and distance traveled of the movements or the gestures of the user. The triangulation data provides a coordinate in the X, Y, and Z planes. In some embodiments, the raw data to make these measurements may be provided to or read by the processor 306 periodically (e.g., 30 readings per second, etc.) such that the processor 306 may establish or create a movement vector from the individual measurements.

In various embodiments, the triangulation may be based on the angle of reflection of the infrared light emitted on the object that it reflects upon (e.g., a hand, etc.) and the angle it returns to the positional sensor 304. In various embodiments, the infrared emitters of the positional sensors 304 may be physically separated from the infrared receiver of the positional sensors 304, such that angles of reflection and therefore, distances along the X and Y axes may be computed.

In some embodiments, sub-groups of positional sensors 304 (e.g., positional sensors 204 & 204a of FIG. 2) in which different positional sensors 304 are placed or positioned at different points vertically may be employed. In such an embodiment, comparing the computed X and Y coordinates of the reflection point between the different positional sensors 304 within the sub-group may yield a determination of the Z coordinate of the point of reflection. It is understood that the X, Y and Z coordinates may be computed with reference to the virtual three dimensional coordinate system, as described above. Furthermore, it is also understood that these coordinate computations may be made for each positional sensor 304 in the plurality of different positional sensors 304.

As described above, in various embodiments, the sensor apparatus or device 300 may include a processor 306. In some embodiments, the processor 306 may be configured to initialize the sensor apparatus or device 300 and, during normal sustained operation, process the data received or captured from the optical sensor 302 and the plurality of positional sensors 304.

In some embodiments, the processor 306 may be configured to initialize the sensor apparatus or device 300. In one embodiment, such initialization may include evaluating operating conditions of all components or at least the sensors 302 and 304. In another embodiment, such initialization may also include initializing the host apparatus interface 310 and establishing any communication with the host apparatus 350. In yet another embodiment, such initialization may further include providing a clock signal to all components or at least the sensors 302 and 304. In various embodiments, such a clock signal may facilitate the sampling or reading of the data output of the sensors 302 and 304 at a frequency of 30 times per second; although, it is understood that the above is merely one illustrative example to which the disclosed subject matter is not limited.

In some embodiments, the processor 306 may be configured to, after the sensor device 300 is initialized, process the data received or captured from the optical sensor 302 and the plurality of positional sensors 304. In one embodiment, the processor 306 may be configured to receive and process the image data captured by the optical sensor 302. In another embodiment, the processor 306 may be configured to receive positional information captured by the plurality of positional or infrared sensors 304 and determine, for each positional or infrared sensor 304, a movement vector including coordinates that represents movement associated with the respective positional or infrared sensor 304.

In one embodiment, the processor 306 may be configured to receive and process progressive scan data output from of the optical sensor 302 (e.g., via photoelectric cells). In various embodiments, such data may be received once every $30^{th}$ of a second. In various embodiments, the data from every vertical and horizontal scan may be transferred in parallel.

In some embodiments, processor 306, or the software/firmware executed by the processor 306, or a combination thereof may be configured to refrain from making a decision regarding the information provided by the optical sensor 302. In such an embodiment, the processor 306 may only be configured to align all the image signals or data into the following outputs: an analog synchronized horizontal and vertical signal, a digital serial data, and a clock signal employed to synchronize the other signals.

In another embodiment, the processor 306 may be configured to receive positional information captured by the plurality of positional or infrared sensors 304 and determine, for each positional or infrared sensor 304, a movement vector including coordinates that represents movement associated with the respective positional or infrared sensor 304.

In one embodiment, the processor 306 may be configured to execute a loop or polling processes in which the processor 306 receives or looks for any change in the signal representing the positional information captured by the plurality of positional or infrared sensors 304. In one embodiment, the processor 306 may simply be configured to determine if a change in status or data provided the positional or infrared sensors 304 has occurred.

In one embodiment, a change in status or data occurs in one of the positional or infrared sensors 304 the processor 306 may be configured to engage in a triangulation calculation which produces X, Y, and Z coordinates, as described above.

In various embodiments, by periodically computing the X, Y and Z coordinates (e.g., 30 times per second, etc.) the processor 306 may produce a vector of coordinates that describes a movement related to one of the positional or infrared sensors 304. For example, in one embodiment including four positional or infrared sensors 304, four movement vectors would be produced and then translated into four digital output signals.

In various embodiments, the positional or infrared sensors 304 may be configured to produce an analog signal (e.g., comprising voltage levels of 0-3V, etc.) that is translated into digital levels with synchronized serial outputs. In some embodiments, the voltage levels may express the position, direction, and speed of the movement captured by the positional or infrared sensors 304.

In various embodiments, the processor may provide the following outputs: a plurality of digital signals from the positional or infrared sensors 304, one for each positional or infrared sensor 304; an analog synchronized horizontal-vertical signal from the optical sensor 302, a digital serial data signal from the optical sensor 302; and a digital clock signal related to synchronizing the optical sensor 302 related signals. Although, it is understood that the above are merely a few illustrative examples to which the disclosed subject matter is not limited. In various embodiments, the processor 306 may be configured to process the inputs from the positional or infrared sensors 304 and the optical sensor 302 substantially simultaneously.

In some embodiments, the sensor device 300 may include a host apparatus interface 310 configured to provide signals relating to the processed image data captured by the optical sensor 302 and the plurality of movement vectors captured by the plurality of positional sensors 304 to a host apparatus 350. In various embodiments, the host apparatus 350 may be configured to be controlled, at least in part, by gestures made by the user. In one specific embodiment, the host apparatus interface 310 may be configured to provide signals in a manner sufficiently or substantially compliant with the Universal Serial Bus (USB) 2.0 standard, its predecessors, its derivatives or successors (hereafter merely "the USB standard"). *Universal Serial Bus Specification*, Compaq et al., Revision 2.0, Apr. 27, 2000. In such an embodiment, the sensor device 300 may be configured to receive power via the host apparatus interface 310 and may not require a separate power source.

In various embodiments, the host apparatus interface 310 may be configured to provide signals fewer signals from the sensor apparatus or device 300 than are produced by the processor 306. In such an embodiment or for other various reasons, the sensor apparatus or device 300 may include a multiplexer 308 or similar signal reduction component (e.g., a signal encoder, a signal compressor, etc.). In such an embodiment, the multiplexer 308 may be configured to receive the parallel signals from the processor 306 and translates them into a serial signal or signals through standard communication protocols (e.g., a signal sufficiently compliant with the USB standard, etc.). In various embodiments, the multiplexer 308 may be configured to time multiplex the processor 306 produced signals into groups or individual signals.

In one embodiment, either the multiplexer 308 and/or the host apparatus interface 310 may be configured to register one or more the standard device drivers or device signatures with the host apparatus 350 or the operating system thereof. In one embodiment, the multiplexer 308 and/or the host apparatus interface 310 may be configured to register one or more of a mouse, a camera, a joystick, and a keyboard, etc.; although, it is understood that the above are merely a few illustrative examples to which the disclosed subject matter is not limited. In various embodiments (e.g., including a plug-and-play operating system, etc.), this registration may only occur the first time the sensor device 300 is coupled with the host apparatus 350.

Figure 4A:
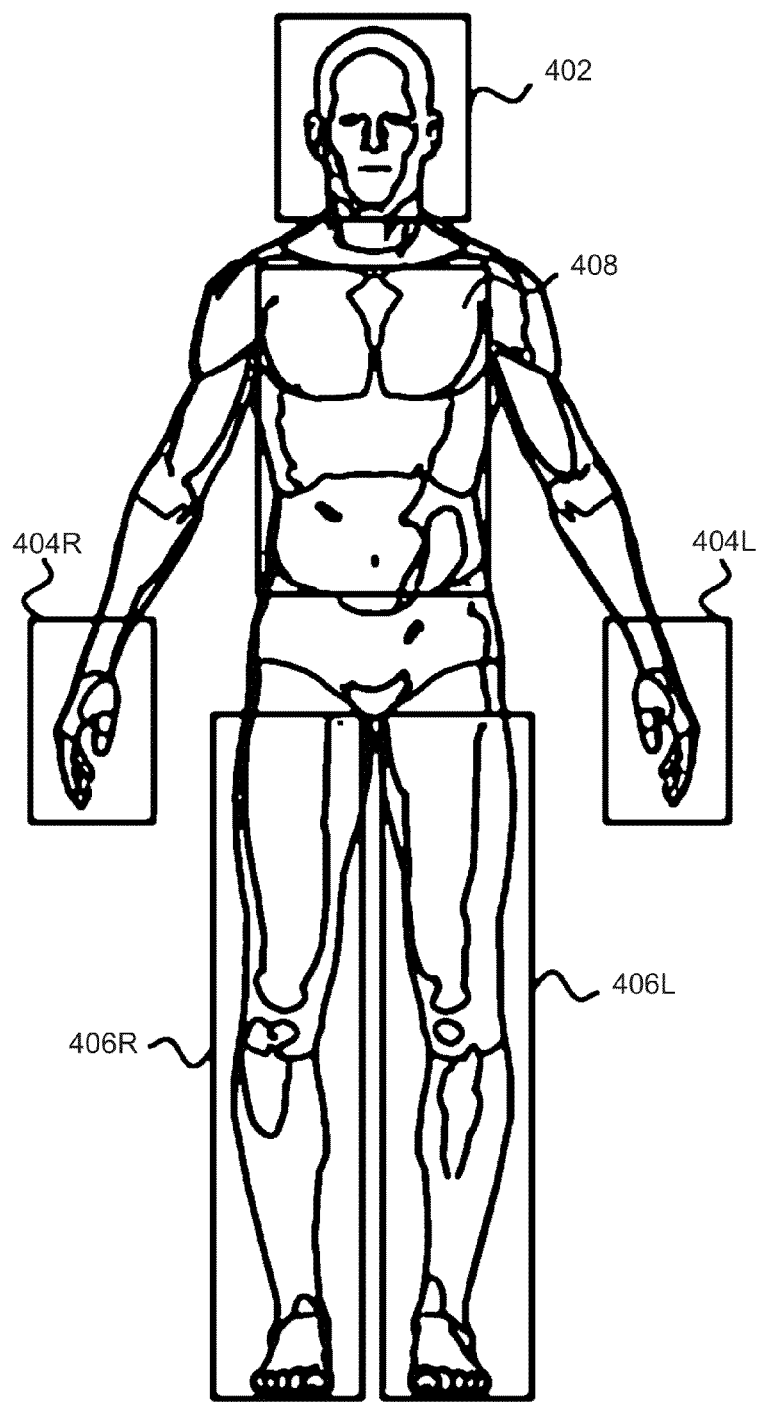
FIG. 4 is a series of diagrams of example embodiments of systems in accordance with the disclosed subject matter.
Figure 4B:
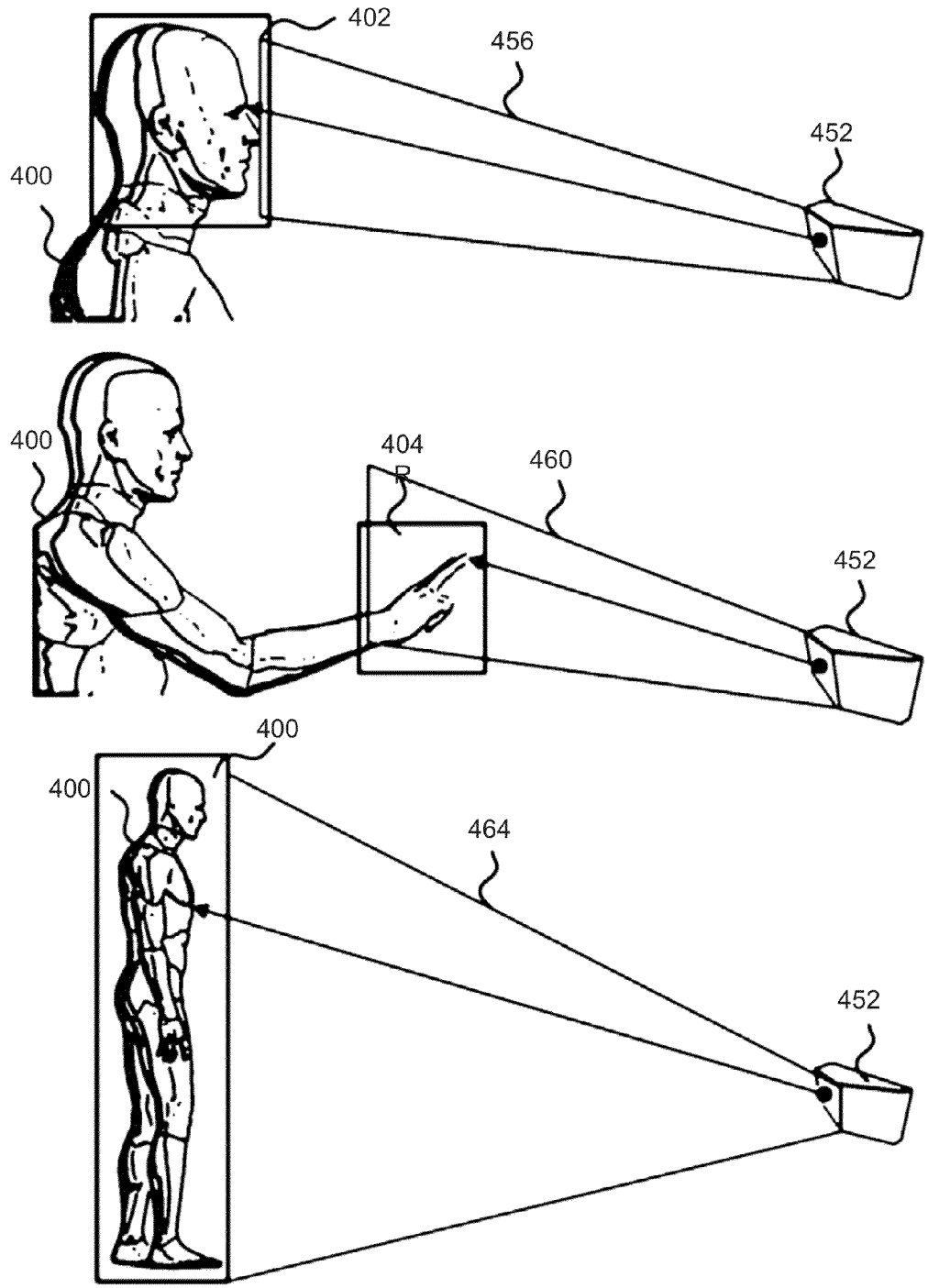

FIG. 4 is a series of diagrams FIGS. 4a and 4b of example embodiments of a system 401 in accordance with the disclosed subject matter. The system 401 illustrates embodiments of ways in which the user's body may be tracked or captured by a sensor apparatus 452 in order to determine gestures made by the user. In various embodiments, these gestures may be employed to control, via gesture-based input, a host apparatus or device (not illustrated).

FIG. 4a illustrates a user 400. In various embodiments, the sensor apparatus 452 or system comprising the sensor apparatus 452 may track movement of one of more of the following regions of parts of the user's 400 body: the head 402, the torso 408; the hands 404R and 404L, and/or the legs 406R and 406L. In various embodiments, the selection of which regions of body parts to track may be predetermined, based upon the controlled application, and/or user selectable, in various embodiments.

FIG. 4b illustrates a system 401 configured to track the movement and gestures of one or more of the user's 400 body parts. A first portion of FIG. 4b. illustrates an embodiment in which the movement or gestures made by the user's 400 head region 402 are tracked and captured. In such an embodiment, as the user 400 moves their head an application may be controlled. For example, in one specific embodiment, an application may include a first person shooter (FPS) video game, such that as the user's head 402 moves the virtual camera of the FPS (showing the virtual world as seen by the player) moves. In such an embodiment, as the user 400 looks up the user's character in the FPS may also look up, and so on. In another embodiment, the application may comprise a special needs application for a user with limited mobility (e.g., a quadriplegic, etc.) such that nods or other movements may be mapped to more typical user interface actions. Although, it is understood that the above are merely a few illustrative examples to which the disclosed subject matter is not limited.

The second portion of FIG. 4b illustrates an embodiment in which the movement or gestures made by the user's 400 hands or at least right hand region 404R are tracked and captured. In such an embodiment, as the user 400 moves their hand an application may be controlled. For example, in one specific embodiment, an application may include a photograph gallery application. In such an embodiment, as the user 400 waves their hand 404R or fingers 404R photographs may be selected, zoomed, minimized, etc. In another embodiment, the user's hand 404R movements or gestures may be used control a virtual keyboard or mouse. It is understood that the above are merely a few illustrative examples to which the disclosed subject matter is not limited.

The third portion of FIG. 4b illustrates an embodiment in which the movement or gestures made by the user's 400 entire body or at least torso 408 are tracked and captured. In such an embodiment, as the user's body 400 or torso 408 moves an application may be controlled. Again, various applications may include video games, special needs application, trainers, etc. may be controlled by such a system 401 and the gestures created or captured by the user's 400 movements. It is understood that the above are merely a few illustrative examples to which the disclosed subject matter is not limited.

FIG. 5 is a flow chart of an example embodiment of a technique in accordance with the disclosed subject matter. In various embodiments, the technique 500 may be used or produced by the systems such as those of FIG. 1, 2, 3, or 4. Furthermore, in various embodiments, the technique 500 may be used or employed to produce constellations of FIGS. 6 and 7. Although, it is understood that the above are merely a few illustrative examples to which the disclosed subject matter is not limited. It is understood that the disclosed subject matter is not limited to the ordering of or number of actions illustrated by technique 500.

Block 502 illustrates that, in one embodiment, a sensor application may be initialized. In one embodiment, from the perspective of the host apparatus, this initialization may include establishing a connection between the sensor apparatus and the host apparatus, as described above. In some embodiments, initializing may include testing whether or not there is a physical connection between the sensor apparatus and the host apparatus. If there is not, the host apparatus or device driver may end the control process. In some embodiments, this may include warning the user that the sensor apparatus is not available.

If a connection with the sensor apparatus is made, the host apparatus or driver may, in one embodiment, verify the operating status of the optical sensor and adjust the image sequences or data ultimately coming from the optical sensor. In various embodiments, if the image sequence or data is satisfactory and properly synchronized (via a received synchronization clock), a verification the data or the plurality of movement vectors from the positional or infrared Sensors may be performed.

In various embodiments, initializing may include testing the lighting conditions. In some embodiments, one of the factors in the tracking of shapes and movements may be the amount of light in the ambient space where the sensor apparatus is being operated. In various embodiments, once the scene's or user's surroundings lighting conditions have been compared, the software exclusively tracks the presence of a human face. In various embodiments, one or more of the action(s) illustrated by this Block may be performed by the apparatuses or systems of FIG. 1, 2, or 3, as described above.

Block 504 illustrates that, in one embodiment, the host apparatus may 504 receive, from the sensor apparatus, a plurality of signals relating to visual image data and a plurality of movement vectors produced in response to gestures made by a user, as described above. In various embodiments, receiving may include receiving one or more of the following signals: a plurality of digital signals from the positional or infrared sensors 304, one for each positional or infrared sensor 304; an analog synchronized horizontal-vertical signal from the optical sensor 302, a digital serial data signal from the optical sensor 302; and a digital clock signal related to synchronizing the optical sensor 302 related signals, as described above. In some embodiments, some or all of such data may have been received as part of the initialization process, as described above. In various embodiments, one or more of the action(s) illustrated by this Block may be performed by the apparatuses or systems of FIG. 1, 2, or 3, or the driver 352 of FIG. 3, as described above.

Block 506 illustrates that, in one embodiment, based upon the received plurality of signals, the host apparatus may identify at least one constellation of reference points, wherein each constellation is associated with a respective body part of the user, as described above. Block 508 illustrates that, in one embodiment, an initial user reference point constellations may be identified (e.g., the user's face). Block 510 illustrates that, in one embodiment, the number of constellations identified or attempted to be identified may be based, at least in part, upon the distance between the user and the sensor apparatus. Block 512 illustrates that, in one embodiment, if the user is at least a minimum distance or close range distance away from the sensor device (wherein "a close range" may be a predetermined or configurable distance), an attempt may be made to identify a constellation of reference points for the user's face. Block 514 illustrates that, in one embodiment, if the user is a medium distance away from the sensor device (wherein "a medium distance" may be a predetermined or configurable distance), an attempt may be made to identify a constellations of reference points for both the user's face and hands. Block 516 illustrates that, in one embodiment, if the user is more than a medium distance away from the sensor device, but less than a maximum distance away from the sensor device or a long range distance from the sensor device (wherein "a long range" may be a predetermined or configurable distance), an attempt may be made to identify a constellations of reference points for the user's face, hands, and torso. In various embodiments, one or more of the action(s) illustrated by this Block may be performed by the apparatuses or systems of FIG. 1, 2, or 3, or the driver 352 of FIG. 3, as described above.

In various embodiments, the optimal tracking distance for the system may be determined by the scene's lighting. In another embodiment, another factor may be the range of the hardware's field of view which may be sufficient to allow for the detection of the reference points on the user. In such an embodiment, the limit of the field of view may create a minimum operating distance (e.g., 15 cm); although, it is understood that the above is merely one illustrative example to which the disclosed subject matter is not limited. In various embodiments, the system may assume a default distance of operation, but this variable may be dependent on the user's physical movements (related to any part of the user's body) and positioning. In various embodiments, a user's variable distance of operation may not pose a problem for the system since it may be capable of continuously tracking the user without the change in position affecting its function or precision.

In various embodiments, when the user places themselves in front of the sensor device, the host apparatus or driver may assume that the user's face is visible. At this point the host apparatus or driver may, in one embodiment, initializes a routine responsible for extracting the user's facial features, and his anthropometric characteristics. In various embodiments, this may include measuring or modeling the user's skin color, and detecting the position and properties of the user's facial zones: the verticality of the nose region, the horizontally of the eyes and mouth, and the extremities of the head, etc. In such an embodiment, once these parameters are located, the host apparatus or driver may be configured to assign references points that it will use during the tracking process.

In various embodiments, these actions may be substantially automatic and require no calibration. In such an embodiment, the user may simply remain in their initial position within the space for less than a second. Once the host apparatus or control software (e.g., a driver, etc.) has detected the user, the host apparatus or control software may wait for a movement away (distancing) of the user, at which point host apparatus or control software may automatically initiate a new lighting validation sequence.

In various embodiments, once the host apparatus or control software identifies the user, it may assign a first reference point to the nose, which is generally a user's most prominent feature. Moreover, in various embodiments, the nose may be a marker that sustains the entire structure of the generated virtual polygon or constellation to subsequently allow for the tracking through a generated spacial gradient. Next, in some embodiments, the host apparatus or control software may locate new reference points in each of the eyes, and traces bi-dimensional coordinates that serve as a guide for the next set of reference points, such as the mouth, and extremities of the head.

In one embodiment, the host apparatus or control software may then model the user's skin color, which may be used in the recognition module to limit the pixel identification process (e.g., pixel matching, etc.) to only or substantially focus on those tones identified within the boundaries of the frontal facial borders.

Next, in one embodiment, samples to identify the skin color are taken from the facial region. The host apparatus or control software may be configured, in various embodiments, to use a density function represented by a Gaussian 3D Red-Green-Blue (RGB) probability to learn the user's skin color. The Gaussian model's parameter (e.g., mean, covariance, etc.) may be estimated using statistical methods. Once these parameters have been estimated, a virtual mask or constellation of reference points for the user's face may be created. Similar operations or actions may be performed for determining constellations of reference points for other parts of the user's body (e.g., hands, torso, etc.)

Block 518 illustrates that, in one embodiment, the movement of the identified constellation(s) may be tracked. In various embodiments, the tracking process may substantially robust when faced with rotations, or deformations of the virtual polygons or constellations and, therefore, may allows the user to move substantially freely. In some embodiments, quick movements by the user or abrupt changes in the light levels may temporarily (e.g., a fraction of a second) cause the markers or reference points to be displaced or lost. For example, if any one point distances itself from the central longitudinal marker (e.g., the nose), this point may, in one embodiment, be discarded in a transitory fashion until it is repositioned and the tracking cycle repeats itself. It is noted that the sensor apparatus may provide the host apparatus with new image and positional data at periodic intervals (e.g., 30 times per second, etc.). In various embodiments, one or more of the action(s) illustrated by this Block may be performed by the apparatuses or systems of FIG. 1, 2, or 3, or the driver 352 of FIG. 3, as described above.

In various embodiments, it may be useful for the host apparatus or control software be able to determine the relationship between the objects or events in the background and the user. In such an embodiment, the host apparatus or control software may be configured to determine the borders and shapes of objectives in each of the images captured by the optical sensor and to differentiate between static objects and user characteristics or body parts. In various embodiments, the host apparatus or control software (e.g., a drive, etc.) that performs the continuous search for the object borders in the images may be resilient to dramatic or slight ambient light changes. In various embodiments, this may be accomplished by searching for predominant gradients while avoiding their explicit detection. The main idea is to consider the detected constellation reference points as projected onto the predominant gradient of the image.

The three dimensional movement of an object (e.g., the user's hand, etc.) between two consecutive image frames may be determined up from the displacements of the reference points through the image plane. As described above, it is noted that the sensor apparatus may provide the host apparatus with new image and positional data at periodic intervals (e.g., 30 times per second, etc.). In various embodiments, the movement may be determined through a linear minimization algorithm, which may, in one embodiment, require a light computational load. In some embodiments, the tracking of object movement may depend on the perpendicular distances between the user's outline and a reference point in the surrounding scene. In that way a relationship may be established between a reference point and the surroundings. In some embodiments, this may avoid a need to run new calculations that identify the point in successive images.

In some embodiments, the process of movement of an object may result in basic shapes that are interpreted by the host apparatus or control software as part of the tracking procedure. In various embodiments, these basic shapes may simply include sides of rectangles or segments of parametric curves. In such an embodiment, each one of the straight segments or curves may be projected on to the image plane as a function of the estimate of the object's movement or the shape that corresponds to the user's body part (e.g., head, hands, torso, etc.). In one embodiment, this search process of the object borders may optimize or increase performance of the host apparatus given that the host apparatus determines the differences between the images that will be analyzed and the movement of the user within them.

In various embodiments, there may exist a correlation between the border process analysis and the background search process in each tracked image or constellation, since, in one embodiment, these parameters may both use the same gradient sensors to calculate the speed of the event through the quotient of the temporary and spatial derivatives in each pixel. In various embodiments, the technique may benefit from noise being filtered out to avoid erroneous readings, which might occur due to the losing or misidentification of the borders or misdetection of the borders. In various embodiments, this filtering may be done through the "masking" of suspect noise pixels thus rendering the borders more reliable and less sensitive to errors.

Block 520 illustrates that, in one embodiment, the host apparatus of controlling software (e.g., a driver) may be configured to convert the movement of the identified constellation(s) into user interface commands (e.g., mouse clicks or movements, etc.). In various embodiments, the correlation of movement of the user's body parts and the user interface commands may be predefined or configurable. In another embodiment, the correlation of movement of the user's body parts and the user interface commands may vary by based upon the controlled application (e.g., operating system, video game, etc.). In various embodiments, one or more of the action(s) illustrated by this Block may be performed by the apparatuses or systems of FIG. 1, 2, or 3, or the driver 352 of FIG. 3, as described above.

Figure 6B:
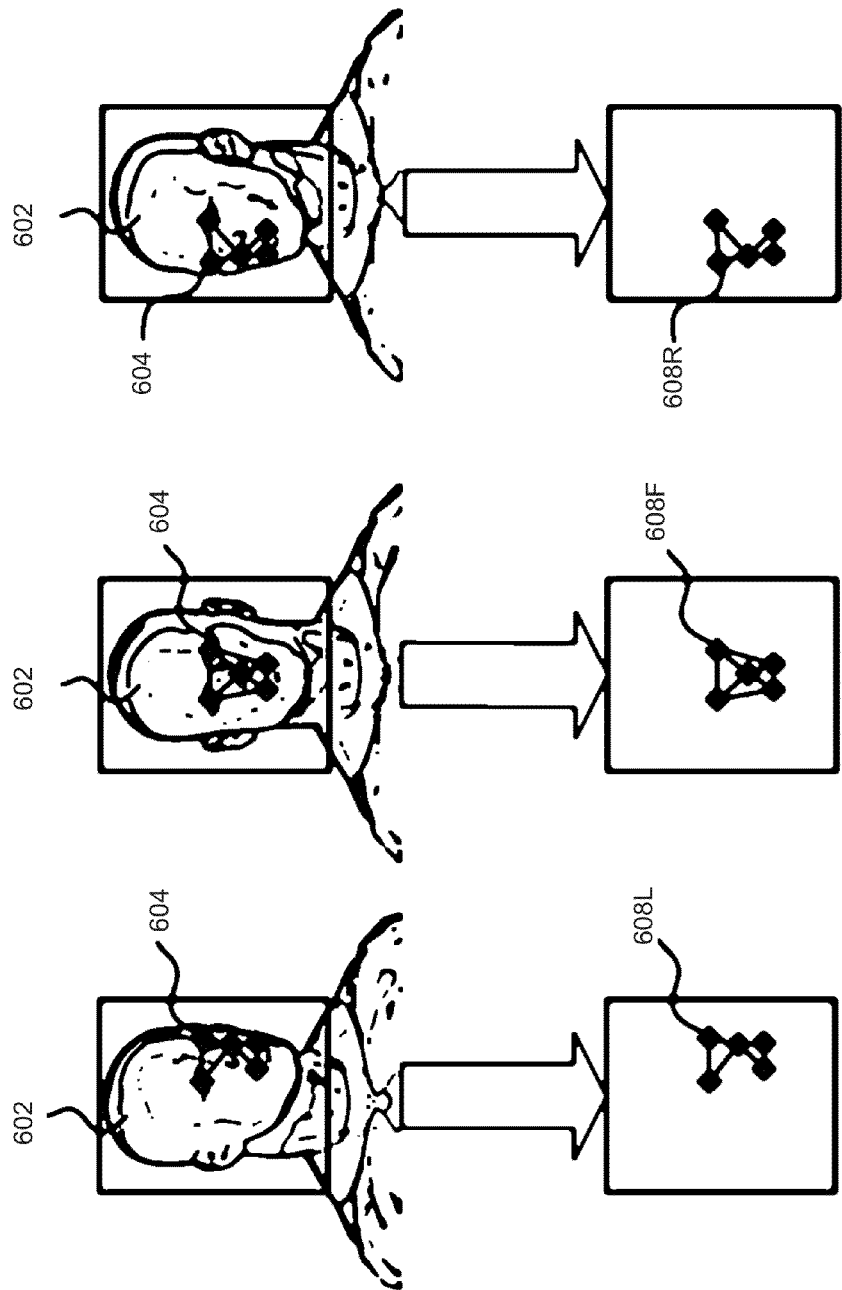
FIG. 6 is a series of diagrams of an example embodiment of a system in accordance with the disclosed subject matter.

FIG. 6 is a series of diagrams of an example embodiment of a system in accordance with the disclosed subject matter. In various embodiments, the system, host apparatus and/or controlling software (e.g., driver, etc.) may determine a constellation 604 of reference points based upon the user's head or face 602.

In various embodiments, the constellation 604 of reference points may change its orientation based upon the position of the user's head 602. For example, the host apparatus or controlling software may be configured to determine the orientation of the user's head 602 based upon the orientation of the constellation 604 of reference points. For example, if the orientation of the constellation 604 of reference points tilts of the left (e.g., orientation 606a) the host apparatus or controlling software may be configured to determine that the user's head 602 is tilted or oriented to the left. Conversely, if the orientation of the constellation 604 of reference points tilts of the right (e.g., orientation 606b) the host apparatus or controlling software may be configured to determine that the user's head 602 is tilted or oriented to the right.

In various embodiments, the deformation or gradient of movement of the reference points of a constellation 604 may be used to determine movement or orientation of the user's body parts 602. Deformation 608L illustrates one sample deformation of constellation 604 when the user turns their head 602 to their left. Deformation 608F illustrates one sample deformation or lack thereof of constellation 604 when the user faces towards their front. Deformation 608LR illustrates one sample deformation of constellation 604 when the user turns their head 602 to their right. In such embodiments, the movement and orientation of the user's head 602 may be determined, at least in part, by the relationship of the reference points to each other. For example, as the user turns to the left the reference point associated with the user's nose may move towards the reference points associated with the user's left eye and corner of their mouth. Conversely, a similar change in distances between reference points may occur as the user turns towards the right.

Figure 7:
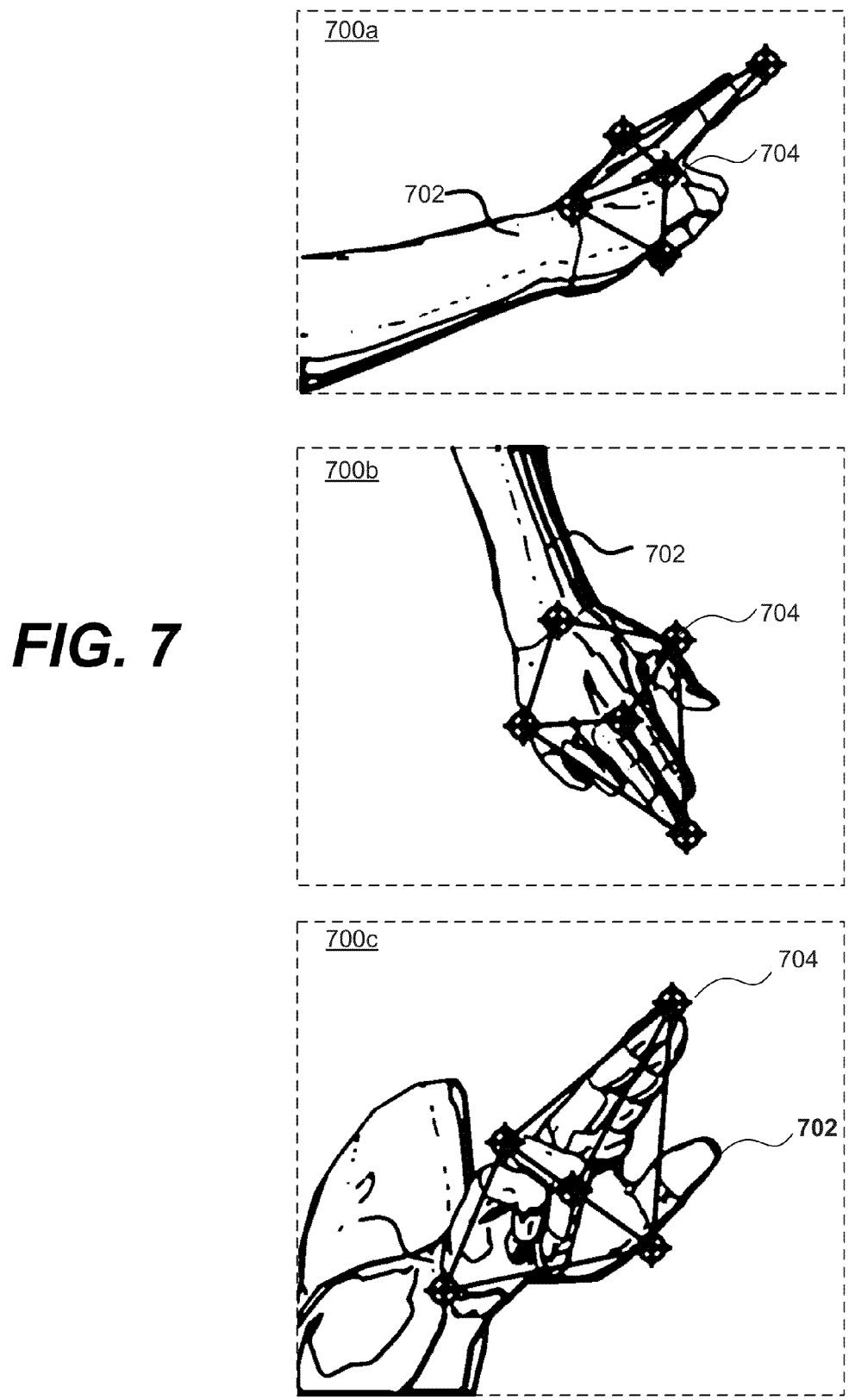
FIG. 7 is a series of diagrams of an example embodiment of a system in accordance with the disclosed subject matter.

FIG. 7 is a diagram of an example embodiment of a system in accordance with the disclosed subject matter. In various embodiments, the system, host apparatus and/or controlling software (e.g., driver, etc.) may determine a constellation 704 of reference points based upon the user's hand 702.

As described above, the deformation or gradient of movement of the reference points of a constellation 704 may be used to determine movement or orientation of the user's body parts 702. Deformation 700a illustrates that, in one embodiment, how the constellation 704 may be deformed as the user movies their hand 702 to point upwards and to their side. Deformation 700b illustrates that, in one embodiment, how the constellation 704 may be deformed as the user movies their hand 702 to point downwards. Likewise, deformation 700c illustrates that, in one embodiment, how the constellation 704 may be deformed as the user movies their hand 702 to point upwards and towards the sensor apparatus.

In various embodiments, the disclosed subject matter may be capable of distinguishing the parts of the user based upon, at least in part, constellation of reference points of irregular polygons. As described above, in one embodiment, the constellation of reference points referring to the head may be drawn to a particular set of polygons, constructed by 4 3-sided polygons that are united by 5 reference points. In another embodiment, the constellation of reference points referring to the hand may be constructed of 3 4-sided polygons, and united by 5 points. In various embodiments, the amount and manner in which the polygons are drawn, created or recognized may differ from one body part to another In various embodiments, once the shape of polygons or the constellation of reference points has been recognized, a user may execute a "click" or other gesture of the hands or other body part. As described above, a gesture may be recognized as a left or a right click and, therefore, result in an effect on the controlled application. In some embodiments, such a gesture may be captured by the sensor apparatus through the process of triangulation and the optical sensor. The host apparatus may then identify the hands (or other body part) and perform the action. In various embodiments, the user's hands may also be able to control movements of the elements on the screen (e.g., pictures, videos, web pages, etc.), and run commands via gestures in real time.

In various embodiments, in addition to identifying single gestures, a determination may be made as to how many times a gesture is performed or whether or not a sequence of gestures are performed. For example, in one embodiment, gestures indicating double or triple clicks may be determined, obtaining different results with each.

In such an embodiment, a single click gesture may include a simple gesture (e.g., a flick of the wrist, etc.) by the left or right hand, as appropriate. In some embodiments, a double click gesture may include a single click gesture executed twice in relatively rapid succession by the same hand (e.g., twice with the left hand, etc.). In yet another embodiment, a triple click gesture may include three single click gestures in relatively rapid succession by the same hand.

In various embodiments, the gestures may include various movements and/or lack of movement (e.g., holding a pose, etc.) that may occur once or as a series of events separated in time. Such complex gestures may be, in one embodiment, programmed via the software interface or operating system of the host apparatus. In some embodiments includes a series of gestures, each of the individual events may be detected by the host apparatus as a separate action or gesture and combined to form a single command. The execution of gestures with hands or fingers may be read and interpreted in three dimensions in real time by the disclosed subject matter. In various embodiments, it may be possible to run or execute combined sequences that include movements and gestures in combination with input from more traditional human interface devices (e.g., a keyboard, a mouse, etc.).

Figure 8:
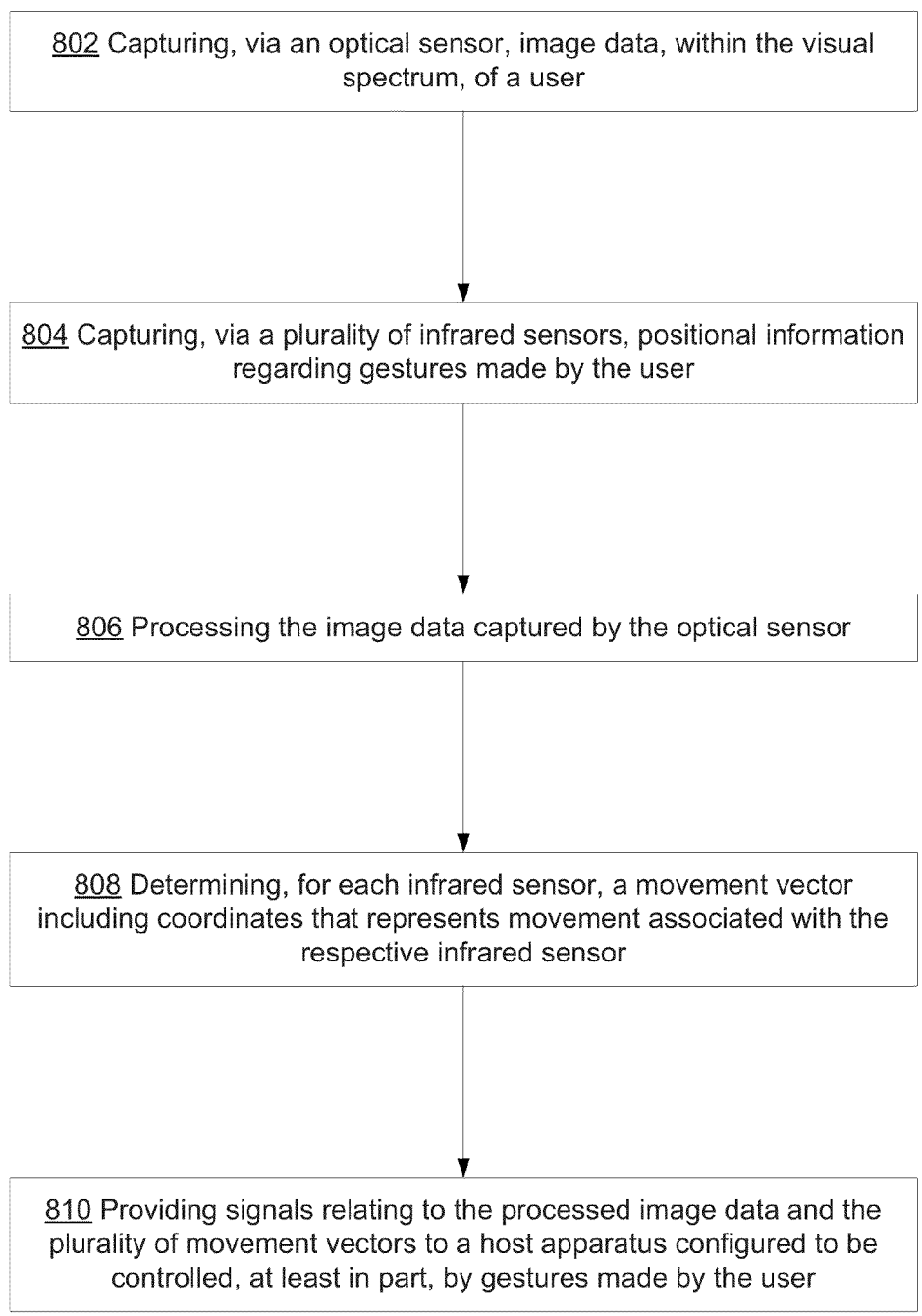
FIG. 8 is a flow chart of an example embodiment of a technique in accordance with the disclosed subject matter.

FIG. 8 is a flow chart of an example embodiment of a technique in accordance with the disclosed subject matter. In various embodiments, the technique 800 may be used or produced by the systems such as those of FIG. 1, 2, 3, or 4. Furthermore, in various embodiments, the technique 800 may be used or employed to produce constellations of FIGS. 6 and 7. Although, it is understood that the above are merely a few illustrative examples to which the disclosed subject matter is not limited. It is understood that the disclosed subject matter is not limited to the ordering of or number of actions illustrated by technique 800.

Block 802 illustrates that, in one embodiment, a sensor application may capture, via an optical sensor, image data, within the visual spectrum, of a user, as described above. In various embodiments, capturing may include producing a visual angle including dimensions of substantially 75 degrees horizontal and substantially 55 degrees vertical, as described above. In one embodiment, capturing may include capturing the image data in low light conditions (e.g., less than approximately 0.5 lux, etc.), as described above. In various embodiments, one or more of the action(s) illustrated by this Block may be performed by the apparatuses or systems of FIG. 1, 2, or 3, or the optical sensors of FIG. 1, 2, or 3, as described above.

Block 804 illustrates that, in one embodiment, a sensor application may capture, via a plurality of infrared sensors, positional information regarding gestures made by the user, as described above. In one embodiment, capturing may include emitting and receiving light at a substantially predetermined frequency, as described above. In another embodiment, the plurality of infrared sensors may be grouped into at least two sub-groups, wherein each sub-group is positioned to the left of the optical sensor and the other sub-group to the right of the optical sensor (or another opposite positioned, in various embodiments), such that each sub-group is positioned to capture positional information regarding gestures made a respective portions of the user's body. In one embodiment, the sub-groups may include a plurality of infrared sensors positioned at different horizontal heights. In various embodiments, one or more of the action(s) illustrated by this Block may be performed by the apparatuses or systems of FIG. 1, 2, or 3, or the positional or infrared sensors of FIG. 1, 2, or 3, as described above.

Block 806 illustrates that, in one embodiment, the image data captured by the optical sensor may be processed, as described above. In one embodiment, processing may include producing the one or more of the following signals: an analog synchronized horizontal and vertical signal, a digital serial data, and a clock signal employed to synchronize the other signals, as described above. In various embodiments, one or more of the action(s) illustrated by this Block may be performed by the apparatuses or systems of FIG. 1, 2, or 3, or the processor 306 of FIG. 3, as described above.

Block 808 illustrates that, in one embodiment, for each infrared sensor, a movement vector may be determined including coordinates that represents movement associated with the respective infrared sensor, as described above. In various embodiments, determining may include performing a triangulation of a point of reflection for each infrared sensor. In another embodiment, determining may include concatenating a series of coordinates into a movement vector, as described above. In various embodiments, one or more of the action(s) illustrated by this Block may be performed by the apparatuses or systems of FIG. 1, 2, or 3, or the processor 306 of FIG. 3, as described above.

Block 810 illustrates that, in one embodiment, signals relating to the processed image data and the plurality of movement vectors may be provided to a host apparatus that is configured to be controlled, at least in part, by gestures made by the user, as described above. In various embodiments, one or more of the action(s) illustrated by this Block may be performed by the apparatuses or systems of FIG. 1, 2, or 3, or the processor 306 or host apparatus interface 310 of FIG. 3, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide additional input to the computer. Other kinds of additional devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus configured to facilitate user gesture-based input comprising:
  an optical sensor configured to capture image data, within the visual spectrum;
  a plurality of infrared sensors configured to capture positional information regarding gestures made by a user, positioned symmetrically on either side of the optical sensor each with an inclination configured to limit a field of view of the plurality of infrared sensors to the right and left sides of the user;
  a processor configured to:
    receive the image data captured by the optical sensor and the positional information captured by the plurality of infrared sensors,
    process the image data captured by the optical sensor, and
    determine, for each infrared sensor, a movement vector indicating a change in at least one of X, Y, and Z coordinates that represents movement associated with the respective infrared sensor; and
  wherein the apparatus is configured to provide signals relating to the processed image data and the plurality of movement vectors to a host apparatus configured to be controlled, at least in part, by gestures made by the user.

2. The apparatus of claim 1, wherein the plurality of infrared sensors includes a plurality of sub-groups, each sub-group including at least one infrared sensor; and
   wherein each sub-group is configured to capture positional information regarding gestures made by a respective portion of the user.

3. The apparatus of claim 1, wherein the plurality of infrared sensors includes:
   a first portion of the plurality of infrared sensors and a second portion of the plurality of infrared sensors,
   wherein the first portion of the plurality of infrared sensors are positioned to capture positional information regarding gestures made by a first portion of the user, and
   wherein the second portion of the plurality of infrared sensors are positioned to capture positional information regarding gestures made by a second portion of the user.

4. The apparatus of claim 1, wherein the optical sensor is configured to capture image data if an ambient light level is above a minimum ambient light level, wherein the minimum ambient light level is a value between 0 and 0.5 lux, inclusive.

5. The apparatus of claim 1, wherein the processor is configured to, for each infrared sensor:
   triangulate a coordinate or at least one point of reflection based upon the positional information captured by the plurality of infrared sensors.

6. The apparatus of claim 1, wherein the processor is configured to produce:
   a plurality of digital signals representing the movement vector associated with each respective infrared sensor;
   an analog synchronized horizontal-vertical signal associated with the optical sensor;
   a digital serial data signal associated with the optical sensor; and
   a digital clock signal configured to synchronize at least the analog synchronized horizontal-vertical signal.

7. The apparatus of claim 1, wherein the optical sensor includes a charge-coupled device, and is configured to produce a visual angle including dimensions of substantially 75 degrees horizontal and substantially 55 degrees vertical;
   wherein a first portion of the plurality of infrared sensors are positioned at a first side of the optical sensor and set-back by at least 15 degrees from a front of the apparatus;
   wherein a second portion of the plurality of infrared sensors are positioned at a second side of the optical sensor and set-back by at least 15 degrees from the front of the apparatus;
   wherein the processor is configured to produce a plurality of signals relating to the processed image data and the plurality of movement vectors; and
   wherein the apparatus further includes:
   a multiplexer configured to time division multiplex between the plurality of signals relating to the processed image data and the plurality of movement vectors, and
   a host apparatus interface configured to communicate the multiplexed signals to the host apparatus.

8. A method to facilitate user gesture-based input comprising:
   capturing, via an optical sensor, image data, within the visual spectrum;
   capturing, via a plurality of positional sensors, positional information regarding gestures made by the user, a first portion and a second portion of the plurality of positional sensors positioned symmetrically on either side of the optical sensor each with an inclination configured to limit a field of view of the plurality of positional sensors to the right and left sides of the user;
   processing the image data captured by the optical sensor;
   determining, for each positional sensor, a movement vector indicating a change in at least one of X, Y, and Z coordinates that represents movement associated with the respective infrared sensor; and
   providing signals relating to the processed image data and the plurality of movement vectors to a host apparatus configured to be controlled, at least in part, by gestures made by the user.

9. The method of claim 8, wherein capturing image data includes capturing image data if an ambient light level is above a minimum ambient light level, wherein the minimum ambient light level is a value between 0 and 0.5 lux, inclusive.

10. The method of claim 8, wherein capturing, via a plurality of positional sensors, includes:
    capturing positional information regarding gestures made by a first portion of the user via a first portion of the plurality of positional sensors, and
    capturing positional information regarding gestures made by a second portion of the user via a second portion of the plurality of positional sensors.

11. The method of claim 8, wherein determining, for each positional sensor, a movement vector includes:
    triangulating a coordinate or at least one point of reflection based upon the positional information captured by the plurality of positional sensors.

12. The method of claim 8, wherein providing signals includes producing at least one of the following:
    a plurality of digital signals representing the movement vector associated with each respective infrared sensor;
    an analog synchronized horizontal-vertical signal associated with the optical sensor;
    a digital serial data signal associated with the optical sensor; and
    a digital clock signal configured to synchronize at least the analog synchronized horizontal-vertical signal.

13. The method of claim 8, wherein capturing image data includes:
    capturing image data via a charge-coupled device, and
    producing a visual angle including dimensions of substantially 75 degrees horizontal and substantially 55 degrees vertical;
    wherein capturing positional information includes:
    capturing positional information from a first group of positional sensors positioned on a first side of the optical sensor and set-back by at least 15 degrees from a front of the optical sensor, and
    capturing positional information from a second group of positional sensors positioned on a second side of the optical sensor and set-back by at least 15 degrees from the front of the optical sensor; and
    wherein providing includes:
    time division multiplexing between the signals relating to the processed image data and the plurality of movement vectors, and
    transmitting the multiplexed signals to the host apparatus.

14. A computer program product for facilitating user gesture-based input, the computer program product being tangibly embodied on a computer-readable medium and including executable code that, when executed, is configured to cause a host apparatus to
   receive, from a sensor apparatus, a plurality of signals relating to visual image data captured by an optical sensor of the sensor apparatus;

receive, from the sensor apparatus, a plurality of movement vectors captured by a plurality infrared sensors of the sensor apparatus and produced in response to gestures made by a user the plurality of movement vectors indicating a change in X, Y, and Z coordinates associated with the gestures, a first portion and a second portion of the plurality of infrared sensors positioned symmetrically on either side of the optical sensor each with an inclination configured to limit a field of view of the plurality of infrared sensors to the right and left sides of the user;

based upon the received plurality of signals, identify at least one constellation of reference points, wherein each constellation is associated with a respective body part of the user;

track the movement of the body part(s) of the user, based at least in part upon the respective identified constellation(s); and convert the movement of the respective body part(s) of the user into user interface commands.

15. The computer program product of claim 14, wherein the executable code configured to cause identifying at least one constellation of reference points also includes:
   identifying the user;
   determining the distance of the user from the sensor apparatus;
   based at least in part upon the distance of the user from the sensor apparatus, determining a number of constellations of reference points to identify.

16. The computer program product of claim 14, wherein the executable code configured to cause identifying at least one constellation of reference points also includes:
   identifying a constellation of reference points associated with a face of the user which includes:
   identifying a reference point associated with a nose of the user,
   identifying a pair of reference points associated with the eyes of the user, and
   identifying at least one reference point associated with a mouth of the user.

17. The computer program product of claim 14, wherein the executable code configured to cause identifying at least one constellation of reference points also includes:
   modeling a skin color of the user; and
   limiting the identification of pixels, received via the plurality of received signals relating to visual image data, to substantially focus on pixels substantially colored with the skin color of the user.

18. The computer program product of claim 14, wherein the executable code configured to cause tracking the movement of the body part of the user also includes:
   determining a deformation within a respective constellation of reference points;
   measuring the gradient of the deformation; and
   based upon the gradient of the deformation, determining a movement of the respective body part of the user.

19. The computer program product of claim 14, wherein the executable code configured to cause tracking the movement of the body part of the user also includes:
   mapping the user's surroundings;
   registering static objects within the user's surroundings;
   periodically receiving, from a sensor apparatus, a plurality of signals relating to visual image data and a plurality of movement vectors produced in response to gestures made by a user; and
   based upon the received signals, remapping the user's surroundings to determine non-static objects.

20. The computer program product of claim 14, wherein the executable code configured to cause tracking the movement of the body part of the user also includes:
   determining the speed of the movement of the body part of the user based upon a temporal derivative and a special derivative of a change in each pixel, received via the plurality of received signals relating to visual image data.

21. The apparatus of claim 1, wherein the plurality of infrared sensors statically positioned.

22. An apparatus configured to facilitate user gesture-based input comprising:
   an optical sensor including a charge-coupled device, and is configured to:
      capture image data within the visual spectrum, and
      produce a visual angle having horizontal and vertical axis;
   a plurality of infrared sensors including a configured to capture positional information regarding gestures made by a user, wherein
      a first portion of the plurality of infrared sensors are positioned at a first side of the optical sensor and set-back from a front of the apparatus, and
      a second portion of the plurality of infrared sensors are positioned at a second side of the optical sensor and set-back from the front of the apparatus;
   a processor configured to:
      receive the image data captured by the optical sensor and the positional information captured by the plurality of infrared sensors,
      process the image data captured by the optical sensor, and
      determine, for each infrared sensor, a movement vector indicating a change in at least one of X, Y, and Z coordinates that represents movement associated with the respective infrared sensor,
   a multiplexer configured to time division multiplex between the plurality of signals relating to the processed image data and the plurality of movement vectors; and
   a host apparatus interface configured to communicate the multiplexed signals to the host apparatus, wherein the apparatus is configured to provide signals relating to the processed image data and the plurality of movement vectors to the host apparatus configured to be controlled based on gestures made by the user.

* * * * *